No. 723,675. PATENTED MAR. 24, 1903.
C. S. JOHNSON.
PIPE COUPLING.
APPLICATION FILED DEC. 27, 1901.
NO MODEL. 3 SHEETS—SHEET 2.
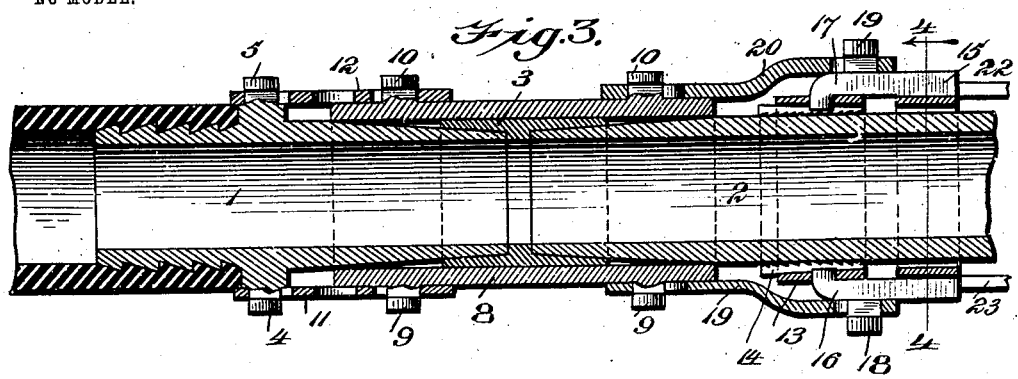
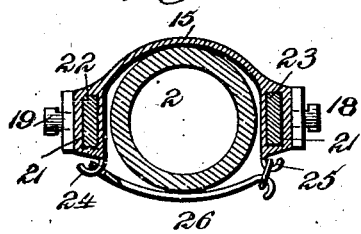
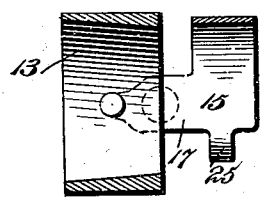
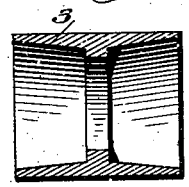
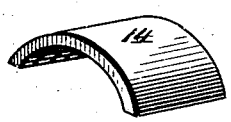
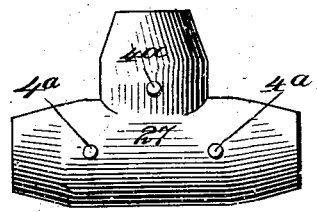
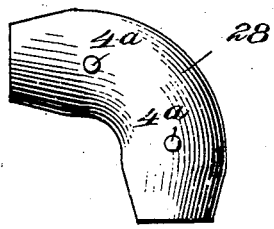
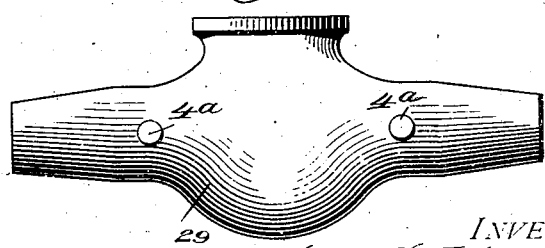
WITNESSES:
H. G. Dieterich
B. P. Funk
INVENTOR
Chas. S. Johnson
BY Victor J. Evans
Attorney No. 723,675. PATENTED MAR. 24, 1903.
C. S. JOHNSON.
PIPE COUPLING.
APPLICATION FILED DEC. 27, 1901.
NO MODEL. 3 SHEETS—SHEET 3.
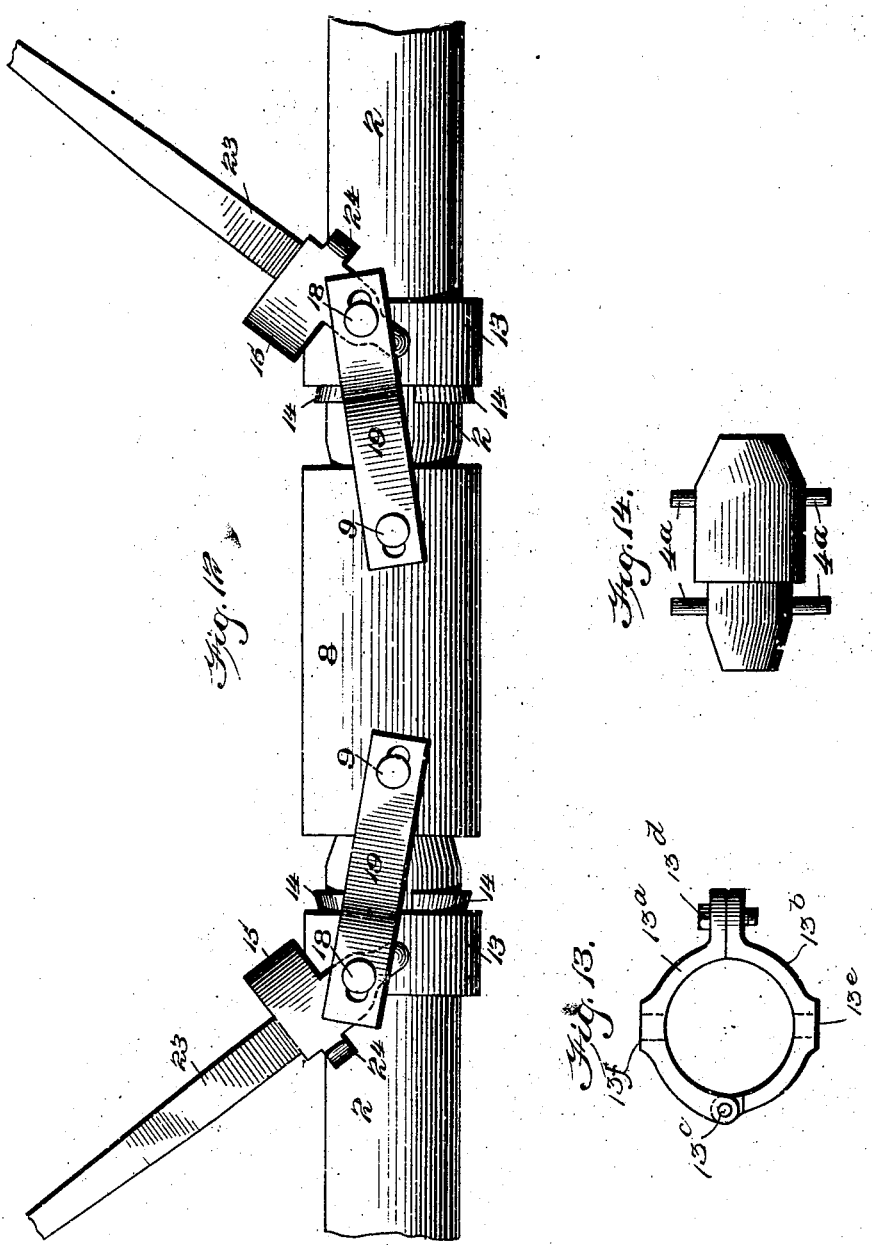
Witnesses
H. T. Dieterich
B. P. Funk
Inventor
Chas. S. Johnson
By Victor J. Evans
Attorney

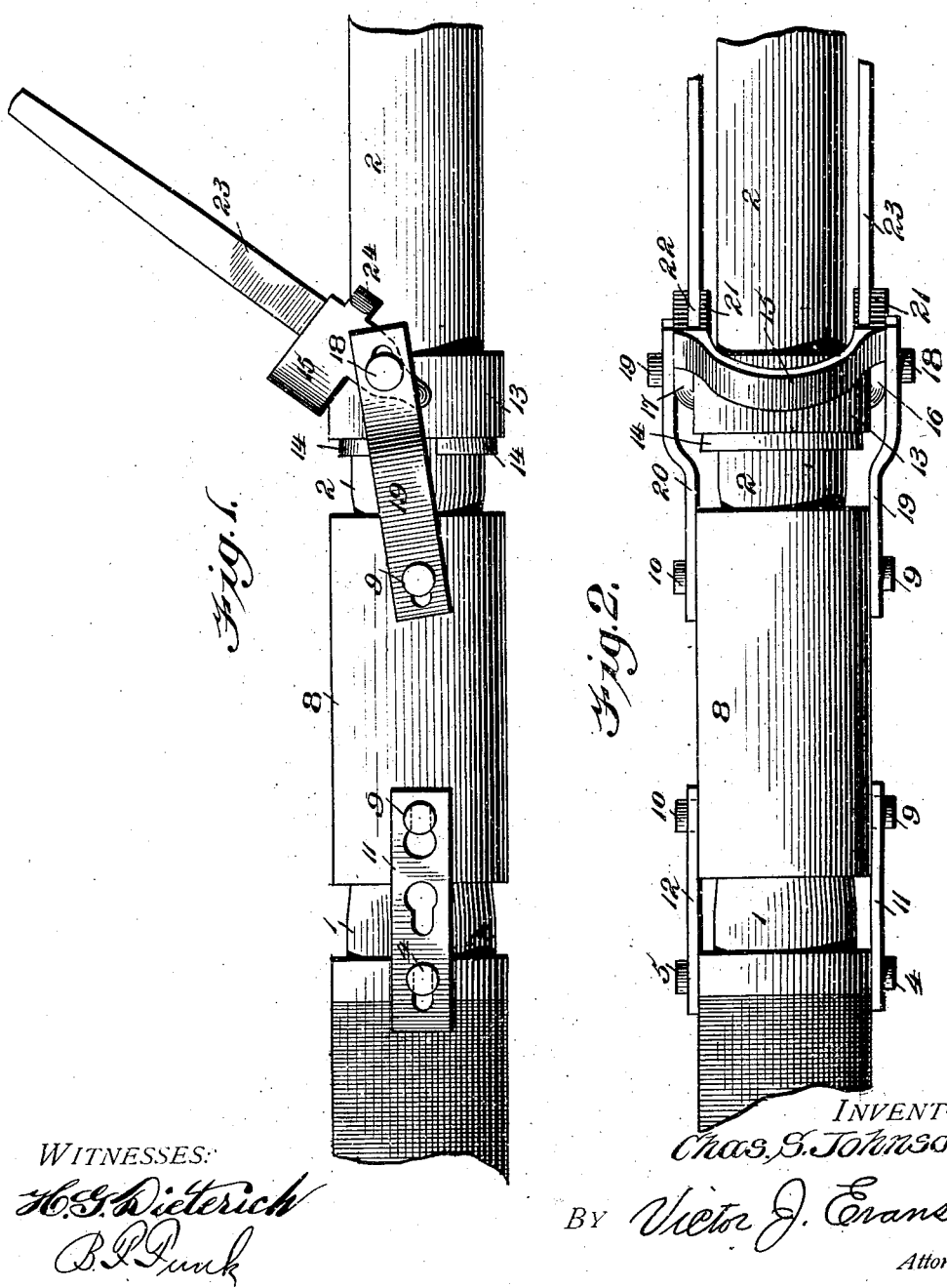

UNITED STATES PATENT OFFICE.

CHARLES SUMNER JOHNSON, OF BROWNVILLE, MAINE.

PIPE-COUPLING.

SPECIFICATION forming part of Letters Patent No. 723,675, dated March 24, 1903.

Application filed December 27, 1901. Serial No. 87,489. (No model.)

*To all whom it may concern:*

Be it known that I, CHARLES SUMNER JOHNSON, a citizen of the United States, residing at Brownville, in the county of Piscataquis and State of Maine, have invented new and useful Improvements in Pipe-Couplings, of which the following is a specification.

This invention relates to a pipe or hose coupling.

The object of the invention is to provide a coupling which may readily attach two or more pipe or hose sections together, so as to make a continuous line connection from the source of supply to the outlet.

A further object is to provide a coupling whereby the pipe or hose may be attached to the valve or other supply.

A still further object is to provide means for capping or closing the end of the pipe.

Further objects, as well as the novel details of construction, will be clearly described hereinafter and illustrated in the accompanying drawings, in which—

Figure 1 is a side elevation of two pipe-sections supplied with my improved coupling, the position of the lever being illustrated just prior to applying or locking the coupling. Fig. 2 is a top plan view of the same. Fig. 3 is a vertical longitudinal sectional view taken through a pair of nozzles and a coupling constructed in accordance with my invention. Fig. 4 is a transverse section on the line 4 4 of Fig. 3. Fig. 5 is a detailed view of the tightening-stirrup. Fig. 6 is a similar view of the intermediate ring into which the nozzles project. Fig. 7 is a detailed prospective view of one of the wedges. Fig. 8 is a sectional view of the same. Fig. 9 is a side elevation of a T-joint constructed so as to be supplied with the coupling herein described. Fig. 10 is an elbow-joint provided with lugs adapted to be engaged by coupling. Fig. 11 is a similar view of a valve-joint constructed in accordance with my improvement. Fig. 12 is a side elevation of two pipe-sections connected together, showing the double-lever coupling. Fig. 13 is an end elevation of a clip to which the levers are adapted to be secured. Fig. 14 is a detail view of a tube which may be attached to the two ends of the pipes to be coupled provided with a coupling constructed in accordance with my invention.

The reference-numerals 1 and 2 designate two nozzles representing the respective ends of two pipe-sections, which are tapered slightly to their respective ends and fit in a ring 3, which is interposed between the ends of the nozzles and overlaps the outer wall, whereby a tight joint is made.

On the nozzle 1 are formed two diametrically oppositely arranged lugs or projections 4 and 5, having heads or shoulders 6 and 7 on the extreme ends thereof.

A cylindrical sleeve 8 fits over the ends of the nozzles 1 and 2 and over the ring 3 and carries on its respective ends oppositely-projecting lugs 9 and 10 of substantially the same construction as those designated by the reference-numerals 4 and 5, and the sleeve 8 and the nozzle 1 are securely fastened together by means of link-bars 11 and 12, which are provided with keyhole-slots adapted to engage and fit over the lugs or projections above referred to.

Over the nozzle 2 is arranged a ring 13, which is fastened to the nozzle by semicylindrical wedges 14, which are threaded interiorly, so as to impinge against the nozzles when within the ring.

A coupling-yoke (designated by the reference-numeral 15) is pivotally secured to the ring 13 by two parallel inwardly-bent arms 16 and 17, which project from said yoke, and carries lugs or projections 18 and 19, which are adapted to be engaged by link-bars 19 and 20, which also engage the sleeve 8. Brackets or slots 21 and 21$^a$ are formed in the ends of the yoke and in which are positioned removable handles 22 and 23, arranged so that by applying the pressure to the levers the yoke may be forced down upon the nozzle 2, and thus draw the nozzles 1 and 2 and ring 3 so close together that a tight joint will be made. On the ends of the yoke are provided upturned lips 24 and 25, which are adapted to be engaged by a strap, such as designated by the reference-numeral 26, as shown in Fig. 4. This will keep the yoke in locked position when desired and retain the pipe-section coupled.

In Fig. 9 I have shown a T-joint 27, supplied with lugs 4$^a$ and flanges 4$^b$, which are adapted to be used in connecting pipe-sections to a joint of this character.

In Fig. 10 an elbow-lever 28 is illustrated, which is provided with conical ends and flanges and lugs to illustrate how the coupling can be made with this character of device.

Fig. 11 illustrates a three-way valve 29, which is arranged so as to be used in connection with my coupling mechanism.

The tube shown in Fig. 14 has an enlarged portion and a restricted portion, each portion being provided with oppositely-disposed pins 4ᵃ. The object of having the ends of different diameters is to provide means whereby different sizes of pipes may be employed. In the form shown in Figs. 9, 10, 11, and 14 the sleeve 8 can be dispensed with, and the links 19 can be fastened direct to the pins 4ᵃ.

Other forms may be used, if convenient, by merely supplying lugs or projections near their ends.

In Fig. 1 I have illustrated a coupling as being in position to be locked, and in Fig. 3 it is shown in its locked position. It will thus be seen that a quick effective coupling may be made, whereby the hose, pipe, or any other tubular conductor of standard size may be quickly attached to a main-line pipe or source of supply and may be readily uncoupled, if desired.

In Fig. 12 I have illustrated a double form of coupling, which represents two pipe-sections being connected together, a lever being provided on each pipe-section. This construction is preferably used when two or more pipe-sections are secured together, although, if found desirable, a single lever may be employed, as shown in Fig. 1, where a pipe and hose are connected.

In Fig. 13 I have illustrated a modified form of clip which may be used in lieu of the ring 13 and be clamped to the pipe. This clip comprises two semicircular members 13ᵃ and 13ᵇ, hinged together, as at 13ᶜ, and the opposite sides thereof provided with two outwardly-projecting ears through which a bolt 13ᵈ passes to secure said clip to the pipe. Two diametrical oppositely arranged openings 13ᵉ and 13ᶠ are arranged in the clip and at right angles with relation to the pivot-point. These openings are for the purpose of receiving the ends of the yoke 15, which is connected to the lever 23.

While I have specifically described what to me at this time appears to be the very best means of accomplishing the desired result, I will have it understood that I do not limit myself to the exact details of the construction shown, but reserve the right to make such like changes and alterations as may suggest themselves from time to time without departing from the spirit of my invention.

Having thus fully described my invention, what I claim as new, and desire to secure by Letters Patent, is—

1. In a coupling the combination of a pair of nozzles having tapered ends and an intermediate ring into which the tapered ends project, a sleeve fitting over the ring in ends of the nozzles, a connection between one of the nozzles and the sleeve, and a pivoted latch carried by the other nozzle and connected to the sleeve, said latch being adapted to be connected so as to draw the nozzles together.

2. In a coupling the combination with a pair of nozzles, an intermediate ring, a sleeve fitting over the ends of the nozzles and the ring, a connection between one of the nozzles and the sleeve, means pivotally secured to the other nozzle and connected to the sleeve whereby the nozzles may be drawn together.

In testimony whereof I affix my signature in presence of two witnesses.

CHARLES SUMNER JOHNSON.

Witnesses:
HIRAM GERRISH,
T. A. McDONOUGH.